United States Patent
Owashi et al.

[11] Patent Number: 5,875,279
[45] Date of Patent: Feb. 23, 1999

[54] SUBSCRIBER TERMINAL OF AN INTERACTIVE COMMUNICATION SYSTEM AND CONTROL DEVICE THEREOF

[75] Inventors: Hitoaki Owashi, Yokohama; Hideo Nishijima, Katsuta; Hiroaki Ono, Fujisawa; Takaharu Noguchi, Yokohama; Hiroo Okamoto, Yokohama; Nobutaka Amada, Yokohama; Kyoichi Hosokawa, Yokohama; Takao Arai, Yokohama, all of Japan

[73] Assignee: Hitachi, Ltd, Tokyo, Japan

[21] Appl. No.: 847,772

[22] Filed: Apr. 23, 1997

Related U.S. Application Data

[63] Continuation of Ser. No. 383,971, Feb. 6, 1995, abandoned.

[51] Int. Cl.⁶ .................................................. H04J 7/12
[52] U.S. Cl. .................................................. 386/46; 348/10
[58] Field of Search ................................. 348/6, 7, 10, 5, 348/460; 386/46, 38, 83; 360/72.1, 72.2; 455/4.2; H04N 7/12

[56] References Cited

U.S. PATENT DOCUMENTS

| | | | |
|---|---|---|---|
| 3,696,297 | 10/1972 | Otero | 455/4.2 |
| 4,528,588 | 7/1985 | Lofberg | 358/122 |
| 4,949,187 | 8/1990 | Cohen | 358/335 |
| 5,027,400 | 6/1991 | Baji et al. | 358/86 |
| 5,038,211 | 8/1991 | Hallenbeck | 348/460 |
| 5,132,992 | 7/1992 | Yurt et al. | 348/7 |
| 5,210,620 | 5/1993 | Kim | 386/38 |
| 5,270,829 | 12/1993 | Yang | 386/83 |
| 5,543,929 | 8/1996 | Mankovitz et al. | 386/46 |
| 5,557,316 | 9/1996 | Hoarty et al. | 348/7 |

FOREIGN PATENT DOCUMENTS

WO 93/16557  8/1993  WIPO ............... H04N 7/173

*Primary Examiner*—Brian Casler
*Assistant Examiner*—LuAnne P. Din
*Attorney, Agent, or Firm*—Fay Sharpe Beall Fagan Minnich & McKee

[57] ABSTRACT

An input terminal (240) for assigning at least one information to be requested and a control circuit (100) for controlling a recording operation, a tape stopping operation and a detecting operation of a head of recorded information of a recording and reproducing apparatus (80) are provided on the side of a subscriber terminal (FIG. 1) having the recording and reproducing apparatus and, after all of information (A, B, C) assigned by the input terminal and received from an information transmitting station (FIG. 2) are recorded, a head of the first recorded information is detected.

1 Claim, 4 Drawing Sheets

FIG. 4

RECORDING PROCESS

| RESIDUAL TAPE CONFIRM | ERROR RATE CONFIRM | RECORD A | RECORD B | RECORD C | POSITION RECORD HEAD |
|---|---|---|---|---|---|

(1) RESIDUAL TAPE CONFIRMATION

| REPRODUCE | STOP | REWIND | STOP |
|---|---|---|---|

(2) ERROR RATE CONFIRMATION

| RECORD | STOP | REWIND | STOP | REPRODUCE | STOP | REWIND | STOP |
|---|---|---|---|---|---|---|---|

(3) RECORDING A, B, C

| RECORD A | STOP | RECORD B | STOP | RECORD C | STOP |
|---|---|---|---|---|---|

(4) POSITIONING OF HEAD OF RECORD

| REWIND | STOP |
|---|---|

SUBSCRIBER TERMINAL OF AN INTERACTIVE COMMUNICATION SYSTEM AND CONTROL DEVICE THEREOF

This application is a continuation application of application U.S. Ser. No. 08/383,971, filed Feb. 6, 1995 is now abandoned.

BACKGROUND OF THE INVENTION

The present invention relates to a subscriber terminal of an interactive communication system, which includes a recording and reproducing apparatus for recording and reproducing a video signal transmitted, according to a request of the subscriber terminal, from a video software supplier, and, particularly, to a control method and apparatus for controlling a recording and reproducing operation of the recording and reproducing apparatus for a video signal transmitted from the software supplier through a suitable interactive transmission line such as coaxial cable, optical cable, telephone line or satellite broadcasting to a subscriber terminal.

A device for receiving and storing a transmitted compressed video signal is disclosed in, for example, Japanese Patent Application Laid-open No. H4-79588.

In the conventional technique disclosed in this article, a video signal is time-compressed and transmitted. In a receiver, the compressed video signal is recorded on a suitable recording medium by a video signal recording and reproducing apparatus such as video tape recorder (VTR) and the compressed video signal read out from the recording medium is time-axis decompressed and displayed. The recording may be performed automatically.

Although, in a conventional digital magnetic recording and reproducing apparatus such as VTR of D2 format, it is possible to increase or decrease a reproducing time by means of a variable reproduction speed system without degradation of image quality, it has been usual that a dubbing of a software of a certain time length takes the same time length as recording time of the software. According to the disclosed technique, the dubbing can be done within a shorter time due to employment of the time axis compression of the video signal. That is, in the disclosed technique, a video signal and audio signal are time-axis compressed to 1/m to reduce a transmitting time to 1/m and bit-compressed to 1/n to reduce a signal frequency band to m/n, where m and n are positive integers. Then, the compressed video and audio signals are attached with parity signals, modulated to a code suitable for a transmission line to be used and transmitted. The transmitted signals are received, demodulated and recorded at high speed by a recording and reproducing apparatus. The high speed recorded signals are reproduced at a normal speed and demodulated while correcting any error in the reproduced signals by using the parity signal. Then, the error corrected signals are bit-expanded and displayed. Therefore, the software can be recorded at higher speed using the same format as that used in the standard speed recording. However, the disclosed technique requires a relatively complicated circuit construction and relatively complicated operation.

SUMMARY OF THE INVENTION

An object of the present invention is to provide a control device for controlling an operation of a digital magnetic recording and reproducing apparatus such as VTR so that an operation thereof is facilitated.

Another object of the present invention is to provide a digital recording and reproducing system in which only specified recording and reproducing apparatus can restore a received video signal.

In order to achieve the above objects, according to the present invention, a subscriber terminal for transmitting an information request to an information supplier, receiving an information transmitted, in response to the information request, through a transmission medium or through another transmission medium having a transmission speed higher than that of the transmission medium and recording the received information, includes an input terminal for assigning at least one information to be requested, an information recording device for recording the assigned information on a storage medium and control means for controlling a recording operation, stopping operation and a search operation for a head of information of the information recording device, wherein said control device controls the recording device such that, after all of the assigned information is recorded, the head of a first recorded information is searched.

Further, according to the present invention, the subscriber terminal includes a receiving circuit for receiving an information signal including an identification signal specific to the subscriber terminal and time axis compressed, a switch circuit for selectively outputting one of the received information including the identification signal and an information reproduced by the information recording device and including the identification signal, a detection circuit for detecting the identification signal from an output of the switch circuit, a decompression circuit for decompressing the output signal of the switch circuit and a copy guard signal processor for processing an output of the decompression circuit, wherein the decompression circuit decompresses the information selected by the switch circuit on the basis of the identification signal detected by the detection circuit.

In a case where the compressed information signal containing the identification signal is restored, the switch device selects the received information containing the identification signal and the latter signal is detected from the output of the switch device. In order to allow the received signal to be restored, the output of the switch device is decompressed and output after the copy guard processing thereof. In a case where the information reproduced from the recording device is restored, the switch device selects the reproduced signal and the identification signal thereof is detected from the output of the switch device. In order to allow the received signal to be restored, the output of the switch device is decompressed and output after the copy guard processing thereof.

BRIEF DESCRIPTION OF THE DRAWINGS

FIG. 4 is a diagram for explaining an operation of the embodiment.

DETAILED DESCRIPTION OF THE PREFERRED EMBODIMENTS

An embodiment of the present invention will be described with reference to FIGS. 1 and 2 which are a block diagram of a subscriber terminal of a cable television system in which a video signal and an audio signal are time-axis-and bit-compressed and transmitted through a transmission line and a block diagram of a transmitter of the system, respectively.

In this embodiment, the transmission line is an interactive coaxial line in which a bi-directional transmission of an information signal is performed. As the transmission line, other lines than coaxial line, such as telephone line or optical cable, may be used. Although, in the embodiment shown in FIGS. 1 and 2, both a video signal and an audio signal are transmitted, only a video signal processing is described for simplicity of description. Further, although a single transmission line is commonly used for a down-link circuit (circuit for transmitting a signal from a transmitter to a subscriber terminal) and an up-link circuit (circuit for transmitting a signal from the subscriber terminal to the transmitter), these circuits can be realized by using a parallel transmission lines. In the latter case, since an amount of information to be transmitted through the up-link circuit is small, the up-link circuit can be realized by a transmission line having smaller transmission rate than that of the down-link circuit. For example, it is possible to use the telephone line for that purpose.

Figure 1:
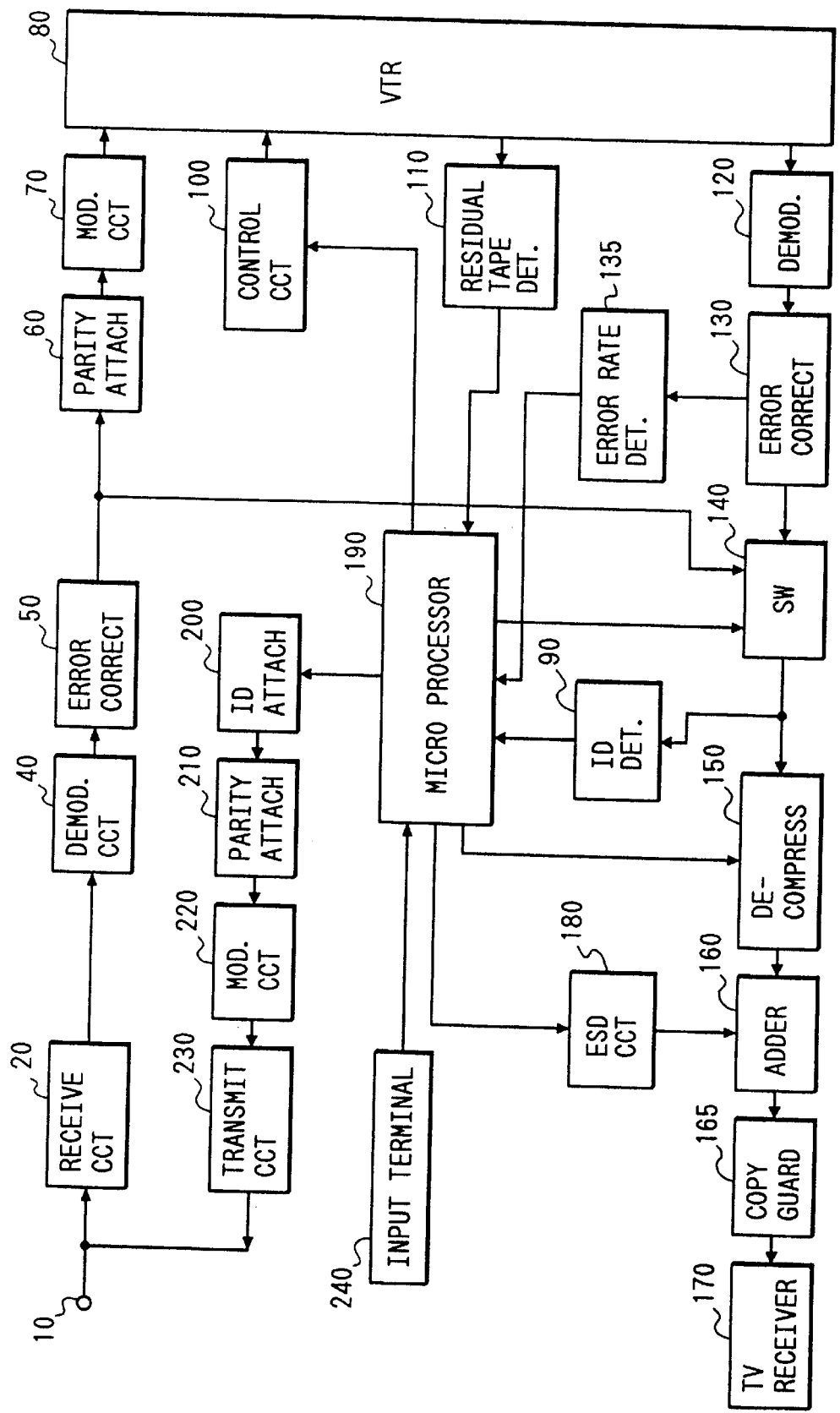
FIG. 1 is a block diagram showing a subscriber terminal according to an embodiment of the present invention.

In FIG. 1, the subscriber terminal comprises an input/output terminal 10 to be connected to the down-link and up-link circuits, a receiver circuit 20 connected to the input/output terminal 10 for receiving a signal input through the down-link circuit, a demodulator circuit 40 connected to an output of the receiver circuit 20 for demodulating an output of the receiving circuit 20, an error correction circuit 50 for checking an error of an output of the demodulator circuit 40, a parity attaching circuit 60 for attaching a parity to an output of the error correction circuit 50, a modulator circuit 70 for modulating the modulated, error-corrected signal with the parity and a recording device 80 which is, in this embodiment, a video tape recorder (VTR). The subscriber terminal further comprises a detection circuit 90 for detecting an ID signal, a control circuit 100 for controlling an operation of the VTR 80, a residual tape detection circuit 110 for detecting a residual amount of a magnetic tape in the VTR 80, a demodulator circuit 120 for demodulating a signal reproduced by the VTR 80, an error correcting circuit 130 for correcting an error of the signal demodulated by the demodulator circuit 120, an error rate detection circuit 135 for detecting an error rate of the demodulated signal, a switch circuit 140 for selecting one of the outputs of the error correction circuits 50 and 130, a decompression circuit 150 for decompressing the signal selected by the switch circuit 140, an adder circuit 160, a copy guard circuit 165, a television receiver 170, an On-Screen-Display (OSD) circuit 180, a microprocessor 190, an ID attaching circuit 200, a parity attaching circuit 210, a modulator circuit 220, a transmitting circuit 230 and an input terminal 240.

Figure 2:
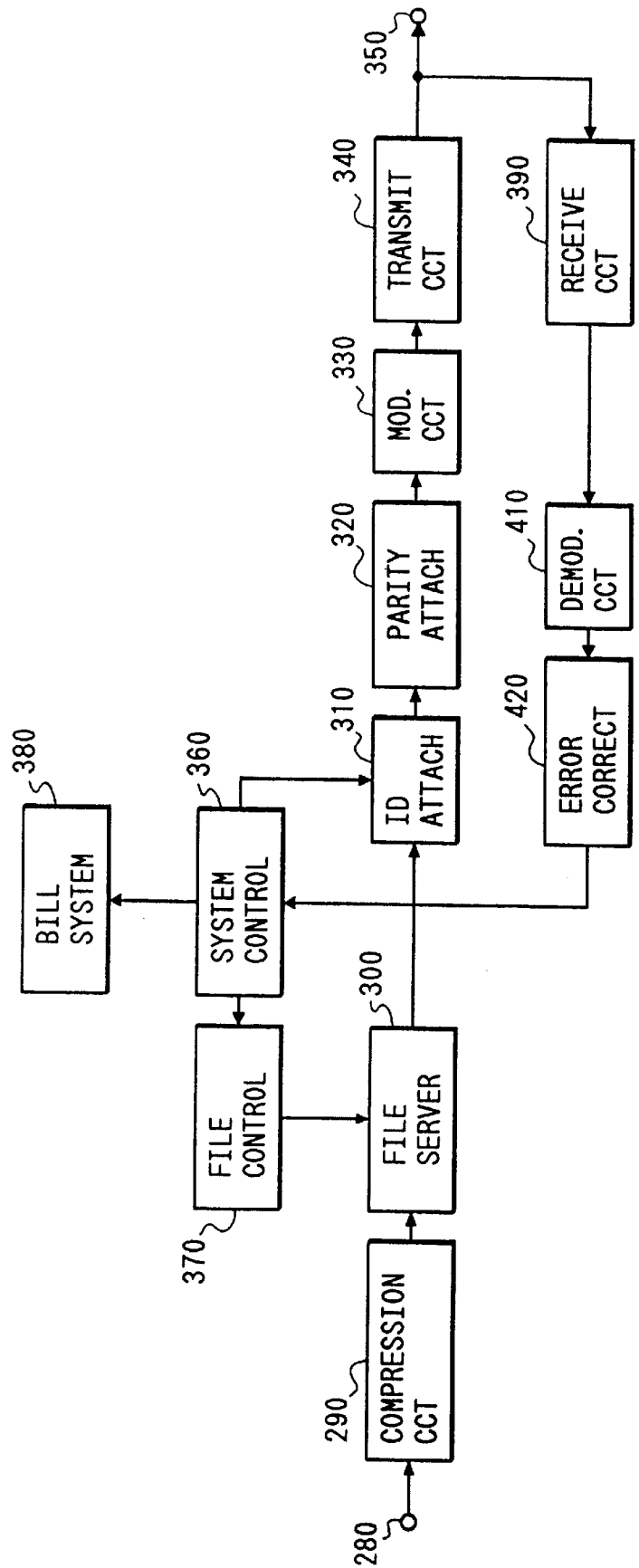
FIG. 2 is a block diagram showing a transmitter together with the embodiment shown in FIG. 1.

In FIG. 2 which is a block diagram of a transmitter which is used in conjunction with the embodiment shown in FIG. 1 when it is applied to a cable television system in which a video signal and an audio signal are time-axis and bit-compressed and transmitted through a transmission line, the transmitter comprises an input terminal 280 for receiving an information to be transmitted to the subscriber terminal shown in FIG. 1, a compression circuit 290 for bit-compressing the input information supplied from the input terminal 280, a file server 300 for storing the compressed information signal, an ID attaching circuit 310 for attaching an ID signal to the compressed information signal supplied from the server 300, a parity attaching circuit 320 for attaching a parity to the compressed information signal, a modulator circuit 330, a transmitting circuit 340, an input/output terminal 350 connected to the transmission line connected to the input/output terminal 10 of the subscriber terminal in FIG. 1, a system controller 360 for controlling an operation of the transmitter, a file server controller 370 for controlling the file server 300 and a billing system 380. The transmitter further includes a receiving circuit 390, a demodulator circuit 410 and an error correcting circuit 420.

First, an operation of the transmitter shown in FIG. 2 will be described. An information signal input to the terminal 280 is supplied to the compression circuit 290 and bit-compressed thereby. The information signal may be a video signal of moving or still image, an audio signal or an execution code signal of a game software. The bit-compression to be performed in the compression circuit 290 may be performed by a system called Moving-Picture-Experts-Group (MPEG) or Jiont-Photographic-Coding-Experts-Group (JPEG), for example. Particularly, for data signal such as the execution code signal of game software, a reversible bit-compression system should be used. The information signal bit-compressed by the compression circuit 290 is supplied to the file server 300 and stored therein according to a control information supplied from the file controller 370 under control of the system controller 360 and information signals and addresses of the file server 300 in which the information signals are stored are stored in the system controller 360.

Now, an operation of the transmitter shown in FIG. 2 when it is applied to a transmission of a charge-free information signal from the file server 300, which can be watched freely at any subscriber terminal, will be described. The charge-free information signal may include, for example, a list table listing titles of movies which can be transmitted from the transmitter.

The charge-free information signal read out from the file server 300 is attached by the ID signal attaching circuit 310 with an ID signal indicating that any subscriber terminal can view. An output signal of the ID signal attaching circuit 310 is supplied to the parity attaching circuit 320. In the parity attaching circuit 320, a parity signal is attached to the information signal, for correcting an error which may occur in the transmission line. An output signal of the parity attaching circuit 320 is supplied to the modulator circuit 330 in which it is modulated such that it can be efficiently transmitted by the transmission line (not shown). For example, 32QAM or 16VSB, etc., may be used as the modulation system. The information signal modulated by the modulator circuit 330 is output by the transmitting circuit 340 through the input/output terminal 350 to the transmission line on a predetermined channel.

In the subscriber terminal shown in FIG. 1, the information signal transmitted from the transmitter shown in FIG. 2 is supplied through the transmission line connected to the input/output terminal 10 to the receiving circuit 20. The receiving circuit 20 receives the charge-free information signal by tuning to the channel on which the charge-free information signal is transmitted from the transmitter. The received information signal is demodulated by the demodulator circuit 40 correspondingly to the modulation system used in the modulator circuit 330 shown in FIG. 2. The demodulated information signal is supplied to the error correcting circuit 50 to correct an error occurred in the transmission line by using the parity attached by the parity attaching circuit 320 shown in FIG. 2.

The information signal whose error corrected by the error correcting circuit 50 is supplied to the switch circuit 140. The switching operation of the switch circuit 140 is controlled by a control signal supplied from the microprocessor 190. When the received signal is to be directly displayed, the switch circuit 140 selects the signal from the error correcting circuit 50 to pass therethrough. The output signal of the switch circuit 140 is supplied to the ID detection circuit 90 and the expansion, that is, decompression circuit 150. The ID detection circuit 90 detects the ID signal contained in the received information signal and supplies it to the microprocessor 190. Since, in this case, the ID signal indicates that the received signal can be viewed by any subscriber terminal, the microprocessor 190 supplies a decompression signal to the decompression circuit 150 in which the received information signal is expanded correspondingly to the compression performed in the compression circuit 290 shown in FIG. 2.

The bit-expanded information signal is supplied to the copy guard circuit 165 through the adder circuit 160. In the copy guard circuit 165, the received and demodulated information signal is attached with a copy guard signal and supplied to the television receiver 170. This copy guard processing prevents the received and demodulated information signal from being copied illegally. A user can watch the received and demodulated information signal on the television receiver 170. When the received information signal is a list of the movie titles, the subscriber inputs one of the titles which he wants to watch through the input terminal 240 to the microprocessor 190. The microprocessor 190 supplies various signals necessary for display the movie selected by the input terminal 240 to the OSD circuit 180 to produce an On-Screen-Display information which is supplied to the adder circuit 160 in which it is combined with the received information signal from the decompression circuit 150.

The microprocessor 190 supplies the selected movie title information to the ID attaching circuit 200 to attach an ID signal specific to this subscriber terminal. An output of the ID attaching circuit 200 is supplied to the parity attaching circuit 210 to attach a parity signal thereto for correcting an error which may occur in the transmission line in the similar manner to the parity attaching circuit 320 shown in FIG. 2. An output signal of the parity attaching circuit 210 is modulated by the modulation circuit 220 to a format suitable for transmission and transmitted by the transmitting circuit 230 from the input/output terminal 10 through a predetermined channel to the transmitter shown in FIG. 2.

The movie title information and the ID signal transmitted from the subscriber terminal shown in FIG. 1 through the transmission line are input through the input/output terminal 350 to the receiving circuit 390 of the transmitter shown in FIG. 2. The signal on the predetermined channel which includes the movie title information and the ID signal and is received by the receiving circuit 390 is then supplied to the demodulator circuit 410 in which it is demodulated correspondingly to the modulation performed by the modulation circuit 220 shown in FIG. 1. Further, the output signal of the demodulator circuit 410 is supplied to the error correcting circuit 420 in which an error occurred in the transmission medium is corrected. An output signal of the error correcting circuit 420 is supplied to the system controller 360 in which it is decided on the basis of the received movie title and ID signal which subscriber terminal wants to receive what movie and, when it is a chargeable movie, the subscriber terminal name, the fee therefor and a necessary information name are input to the billing system 380 to bill the subscriber terminal reliably.

Further, the necessary information name is supplied to the file control circuit 370 to reproduce the necessary movie information from the file server 300. The read out movie information is supplied to the ID attaching circuit 310 and the ID signal specific to the subscriber terminal requesting this movie information is attached thereto according to the control signal supplied from the system controller 360. The movie information with the ID signal is transmitted from the input/output terminal 350 to the transmission line as in the case where the movie title information is transmitted.

In the subscriber terminal, the movie information input from the transmission line through the input/output terminal 10 is processed through the demodulation circuit 40, the error correction circuit 50, the switch circuit 140, the decompression circuit 150, the adder 160 and the copy guard circuit 165 similarly to the movie title information and displayed on the television receiver 170.

When the received information is to be recorded on the VTR, the information is input from the error correcting circuit 50 to the parity attaching circuit 60. The parity attaching circuit 60 attaches to the received information a parity signal and the received information with the parity is modulated by the modulator circuit 70 to a format suitable for recording and recorded on the VTR 80. In this case, for example, a Reed-Solomon code may be used as the parity signal. The modulated signal is recorded in the VTR 80 together with the ID signal. An operation of the VTR 80 is controlled by the control circuit 100 according to the control signal from the microprocessor 190.

When the VTR 80 operates to reproduce the information signal, a reproduced signal is supplied to the demodulator circuit 120. The demodulator circuit 120 operates to demodulate the signal modulated by the modulator circuit 70. The demodulated signal is supplied to the error correcting circuit 130 in which an error occurred in recording and reproducing the information signal is corrected according to the parity signal attached thereto by the parity attaching circuit 60. An output signal of the error correcting circuit 130 is supplied to the switching circuit 140 which selects the signal from the error correcting circuit 130 during reproduction of the VTR on the basis of the control signal from the microprocessor 190.

The output signal of the switching circuit 140 is supplied to the ID detection circuit 90 and the decompression circuit 150. During the reproduction, the ID signal reproduced from the VTR 80 is also detected by the ID detection circuit 90 and is supplied to the microprocessor 190 to determine whether or not the signal can be restored in this subscriber terminal. If it can be restored by the subscriber terminal, the microprocessor 190 supplies a signal which allows the reproduced signal to be expanded to the expansion circuit 150 upon which the latter circuit restores the reproduced signal. The restored signal is displayed on the television receiver 170 through the adder circuit 160 and the copy guard circuit 165 which prevents the reproduced signal from being copied by, for example, adding a signal similar to a synchronizing signal and a signal by which an automatic gain control (AGC) circuit of the storage device operates erroneously to the reproduced signal.

When it is decided on the basis of the ID signal detected by the ID detection circuit 90 that the information is to be charged every time it is reproduced, the microprocessor 190 outputs a billing information to the ID attaching circuit 200 which attaches the billing information to the ID signal specific to the subscriber terminal so that the billing information is transmitted to the transmitter in the same manner as mentioned previously.

In the transmitter, the system controller 360 receives the billing information and the ID signal through the receiver circuit 390, the demodulator 410 and the error correction circuit 420, upon which it causes the billing system 380 to charge on the corresponding subscriber terminal.

Figure 3:
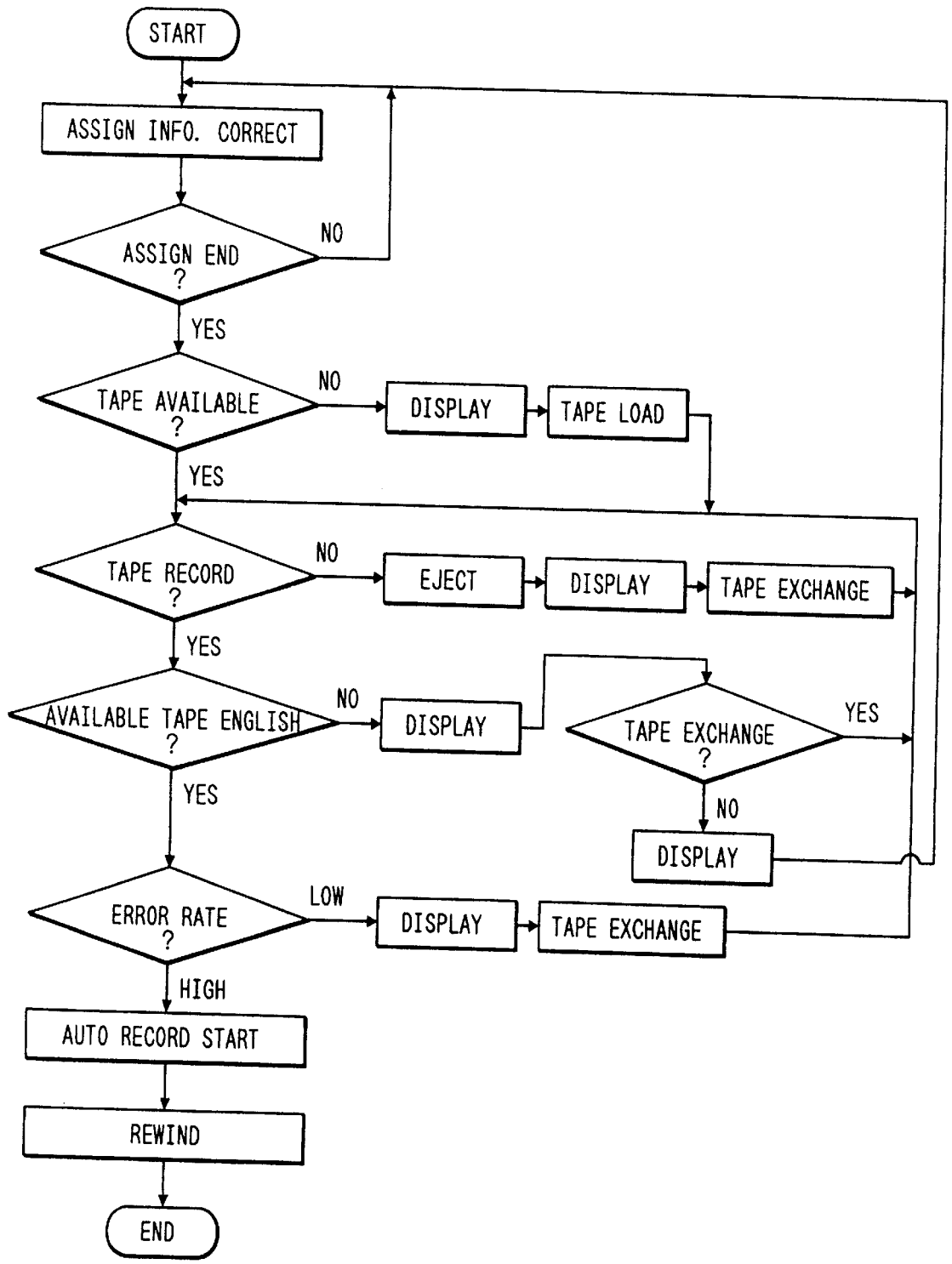
FIG. 3 is a flowchart showing a control operation of the embodiment shown in FIG. 1.

Now a control method of the VTR 80 when at least one information is assigned or selected by the input terminal 240 shown in FIG. 1 will be described with reference to FIG. 3 which shows a flowchart thereof. In FIG. 3, when a plurality of information are to be assigned by the input terminal 240, the above assignment procedure is repeated. After the assignment is completed, it is confirmed whether or not a magnetic tape is loaded in the VTR 80. If any tape is not loaded, the fact is indicated to request a loading of magnetic tape. After the magnetic tape is loaded, it is determined whether or not there is any copy guard on the magnetic tape. When there is a copy guard on the tape and it is impossible to record the information thereon, the magnetic tape is ejected and the fact is indicated to request a substitution of the tape or to remove the copy guard from the tape. After a new tape is loaded, it is determined again whether or not there is any copy guard on the new magnetic tape. If the tape is recordable, a residual amount of available tape is detected. If the residual tape is short, the fact is indicated to allow the tape to be substituted by another tape or to allow the assignment to be re-tried. In a case where the tape is substituted, the above procedures are repeated for the another tape and, in a case where the tape is not substituted, the assignment is re-tried. When there is an available tape amount enough to record the assigned information, the error rate of the tape is confirmed. If the error rate is high, the fact is indicated to allow a substitution of the tape and, after it is substituted by a new tape, the above mentioned procedures are repeated for the new tape. If the error rate is low enough, an automatic recording is started. When the recording is terminated, the tape is rewound up to a position at which the automatic recording is started, terminating the processing.

The detection of the residual tape amount in the above mentioned processing is performed by using the tape residual amount detection circuit 110 shown in FIG. 1. Although FIG. 1 does not show means for detecting tape in the VTR and detecting recordability of the loaded tape (determination whether or not there is a copy guard on the tape), such means can be implemented according to the system employed in a usual VTR. The error rate detection is performed by the error rate detection circuit 135 shown in FIG. 1. In the error correcting circuit 130 shown in FIG. 1, error rate is detected by using the parity code. However, error rate can be detected by inputting errors detected by the error correcting circuit 130 to the error rate detection circuit 135 and summing the errors every unit time. The error rate obtained by the error rate detection circuit 135 is supplied to the microprocessor 190 to determine whether or not the tape is usable.

FIG. 4 shows the overall control operation of the VTR 80 for a case where three information A, B and C are to be recorded. First, after the residual amount of tape and then the error rate are confirmed, the information A, B and C are recorded in sequence and the operation is terminated. FIG. 4(1) shows a confirming operation of residual amount of tape. As shown, the residual amount is detected by reproducing the tape by a detection system used in a usual VTR. After the residual amount of tape is obtained, the tape is rewound. FIG. 4(2) shows a confirming operation of error rate. As shown, a signal for evaluation purpose is recorded first on the tape. Then, the tape is stopped and rewound. After rewinding is terminated, the tape is reproduced to measure the error rate. After the error rate is measured, the tape is stopped and rewound. In this case, the rewinding operation after confirmation of the residual tape amount may be omitted. FIG. 4(3) shows the recording operation of the information A, B and C. As shown, the information A is recorded first and, after the tape is stopped on demand, the information B is recorded. Then, after the tape is stopped on demand, the information C is recorded and the tape is rewound. FIG. 4(4) shows a heading operation. The tape on which the information A, B and C are recorded in the manner mentioned above is rewound and stopped at a position of a head of the information A.

The starting and stopping of the above described recording, stopping, reproducing and rewinding operations, etc., may be automatically controlled by control signals supplied from the transmitter. For example, the control signals from the system controller 360 may be attached to the output of the file server 300 by the ID attaching circuit 310 shown in FIG. 2 and the control signals may be detected by the ID detection circuit 90 of the subscriber terminal and supplied through the microprocessor 190 to the control circuit 100 in FIG. 1.

As described hereinbefore, according to the present invention in which all information assigned are stored in the VTR and then the head of the initially recorded information is detected, it is possible to easily reproduce a tape efficiently.

Further, since the ID signal is recorded in the VTR, it is possible to restore the information by only the authorized subscriber terminal.

What is claimed is:

1. A subscriber terminal for requesting an information transmitting station to transmit information through an interactive communication line and for receiving an information item and a control signal transmitted by said information transmitting station in response to the information request through said interactive communication line or another communication line having a transmission speed higher than that of said interactive communication line, said subscriber terminal comprising:

an input terminal for inputting an information signal designating necessary information for identifying the information item;

a transmitting means for automatically attaching an identification signal identifying the subscriber terminal to the information signal and transmitting the information signal with the identification signal to said information transmitting station;

a recording and reproducing apparatus for receiving and recording the information item transmitted by the information transmitting station; and a control means for detecting the control signal from the transmitting station and controlling the recording and reproducing apparatus by automatically recording on a tape the information item and by rewinding the tape back to a beginning of the information item after the recording of the information item is terminated.

* * * * *